Aug. 26, 1969     J. R. LE BLANC     3,463,626

METHOD FOR COLORING GLASS WITH WATER SOLUBLE COMPOUNDS

Filed June 16, 1966

INVENTOR.
John R. LeBlanc
BY
Christel + Bean
ATTORNEYS.

3,463,626
METHOD FOR COLORING GLASS WITH WATER SOLUBLE COMPOUNDS
John R. Le Blanc, Brockway, Pa., assignor to Brockway Glass Company, Inc., Brockway, Pa.
Filed June 16, 1966, Ser. No. 557,947
Int. Cl. C03b 5/04, 5/16
U.S. Cl. 65—134                                    1 Claim

ABSTRACT OF THE DISCLOSURE

The invention is to a method for coloring molten glass by the addition of water soluble compounds of chromium, copper, cobalt and iron to the flowing molten glass in the forehearth.

---

Figure 1:
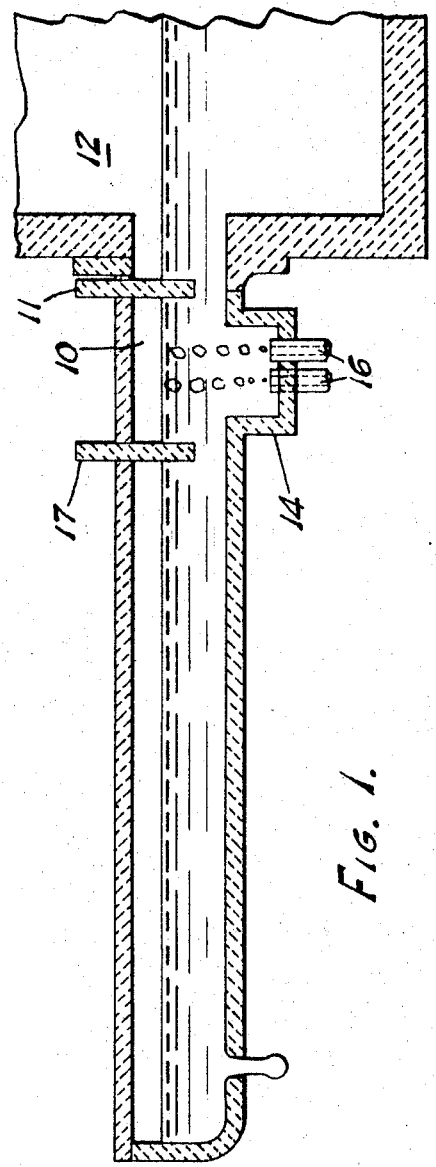

This invention relates to the production of colored glass and particularly to a method of producing colored glass by adding colorants to the molten glass in the forehearth of a continuous tank type glass melting furnace wherein the batch which is melted and fined in the tank proper of the furnace produces clear or flint glass or glass of a color different from that ultimately desired.

In the melting of glass in continuous tank furnaces for manufacturing glass containers or the like it is customary to run clear glass or glass of a given color in a given furnace. Changing color by changing batch ingredients during a run is not practical because a useless mixture of old and new color will continue over a long period of time with large waste of glass and time. To change colors is impracticable without completely emptying and shutting down the furnace.

In order to overcome this problem and make it possible to produce colored glass for temporary periods from a continuous furnace which normally produces flint glass, various proposals have been made to add colored frit or colored molten glass to the molten glass in the furnace, including proposals to add such frit or molten glass to the forehearth after the main body of glass has been melted and fined.

As to adding colored frit to the glass in a forehearth, the amount of cold frit which can be added without producing seed in the glass is very much limited. Also, with frit containing higher concentrations of $Cr_2O_3$ there is a very strong likelihood of precipitating $Cr_2O_3$ in the form of the black specks in the glass. A further objection to coloring glass by adding frit in the forehearth is economic. For example, to run a 0.20% $Cr_2O_3$ emerald green glass using a frit with a 2.0% $Cr_2O_3$ content, which approaches conventional limits of chrome frits, it would require 10% of the total glass pull to be supplied as frit.

If molten colored glass is to be added to flint glass in a forehearth it is necessary to add glass having a very high color concentration in order to produce a desired color in the main body of glass passing to the forehearth from the melting tank of the furnace. Even so, large volumes of colored glass would be required. For instance, to produce a given color concentration in the final glass, even if the concentration of colorants in the molten glass to be added in the forehearth is ten times the desired ultimate concentration, it would require that the molten colored glass added in the forehearth be one ninth of the amount of clear glass supplied to the forehearth from the main melting tank of the furnace.

In any event, the forehearth coloring method of the present invention may be employed by itself or as a supplement to the addition of colored frits or colored molten glass in the forehearth.

Speaking generally, the present invention involves coloring glass by bubbling a colorant into and through the molten glass in a forehearth. In the case of producing green glass from a furnace normally producing flint glass, an aqueous solution of $Na_2Cr_2O_7$ or $K_2Cr_2O_7$ may be introduced by way of bubbler tubes extending through the bottom or sides of a forehearth.

The drawing herein depicts a preferred form of practicing the invention but it is to be understood that this embodiment is set forth to illustrate the principles of the invention, the spirit and scope of which is not limited excepting as defined in the appended claims.

Figure 2:
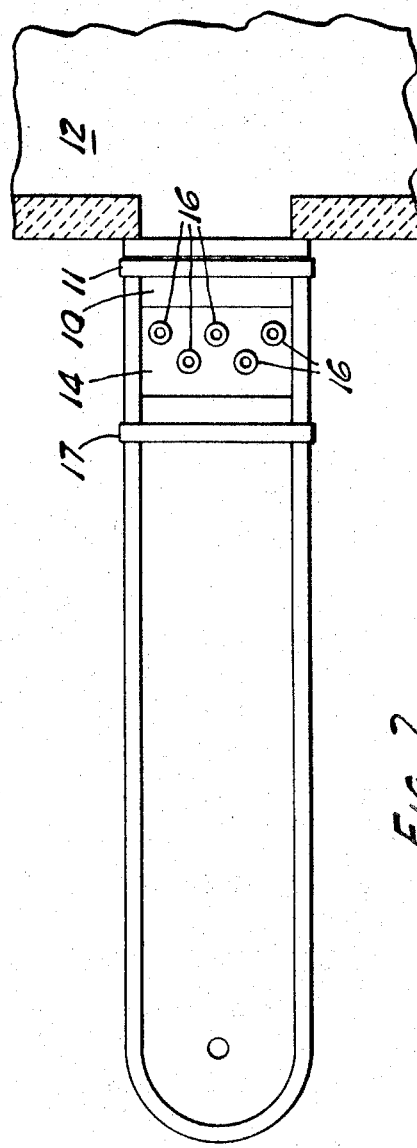

In the drawing:

FIG. 1 is a fragmentary top plan view or horizontal cross section of the entry portion of the forehearth of a continuous glass melting tank furnace arranged for the practice of one ofrm of the method of the present invention; and FIG. 2 is a vertical cross sectional view through the structure of FIG. 1.

In FIGS. 1 and 2 the numeral 10 designates the entry portion of a forehearth, that is, the portion immediately adjacent to the glass melting furnace proper. The numeral 11 designates a skimmer or bridge wall which extends across the furnace in conventional constructions, the numeral 12 designating the terminal portion of the fining section of the furnace tank. The portion of the forehearth shown principally in FIGS. 1 and 2 is known as the cooling section.

In the embodiment shown in the drawing by way of example the forehearth has a depressed well portion 14 to provide a deeper body of molten glass so that colorant material bubbling upwardly therethrough has a longer path of travel upwardly through the glass for reasons given below.

A plurality of refractory bubbler tubes 16 extend upwardly through the bottom of well portion 14 of the forehearth and, using the production of green glass as an example, aqueous solutions of $Na_2Cr_2O_7$ or $K_2Cr_2O_7$ are pumped upwardly through tubes 16 and, upon contact with the molten glass, convert to steam and bubble upwardly through the glass in the well portion and thereabove.

The lengthened distance of upward travel of the bubbles due to the presence of well 14 provides adequate contact time between the bubbles and the glass for optimum solution of steam into the glass, permits sufficient expansion of the bubbles to insure adequate mixing of the glass and colorant by turbulent scrubbing action, and produces a further beneficial mixing of the molten glass by vertical currents therein developed by the rising bubbles.

Mixture of the colorants into the molten glass is further promoted and finalized by the presence of a second skimmer downstream of the bubbler tubes 16 in the form of a bridge wall designated 17 in the drawing, under which the glass must pass in flowing to the usual orifice from which gobs of glass are drawn for fabrication into glass articles.

The concentration of colorant in the aqueous vehicle will depend on various considerations. For instance, to impart a given color a known quantity of colorant, for instance $Cr_2O_3$ must be added to the glass, such addition being made at a rate proportioned to the tonnage pull at the forehearth orifice. If a high degree of bubbling and consequent agitation of the molten glass is desired relative to the amount of $Cr_2O_3$ to be added, then a lower concentration of $Cr_2O_3$ in the water solution will be employed. On the other hand, too great an amount of added water may cool the glass too much and may even freeze the same at the bubbler pipes, thus dictating a higher concentration of $Cr_2O_3$ and consequently less water introduction.

As an example, to color flint glass emerald green a chromium content equivalent to .23% of $Cr_2O_3$ in the glass is required which comes to 4.6 pounds per ton of glass. Using $Na_2Cr_2O_7 \cdot 2H_2O$ as the coloring agent and assuming that all of the $Cr_2O_3$ will be retained in the glass, nine pounds of sodium dichromate will be required per ton of glass. This will incidentally add .07% NaO to the glass.

In a furnace wherein the pull of glass is 30 tons per day and assuming the lowest possible water temperature, 32° F., the water requirement would be 34 mil/minute. At 175° F., the least water requirement would be 17 ml./minute. As indicated above, the amount of water in relation to $Cr_2O_3$ may be adjusted upwardly to promote bubbling and agitation but without too great a cooling effect, such upward adjustment being arrived at empirically.

For producing turquoise and certain shades of blue and green glass cupric oxide (CuO) is the conventional colorant. Aqueous solutions containing cupric oxide in amounts from .02 to .5% will yield turquoise and certain shades of blue and green glass and this range may be achieved by employing aqueous solutions containing .034 to .84% of $CuCl_2$ or .04 to 1.0% of $CuSO_4$. For blue coloration cobalt is the conventional colorant and a range of .001 to .1% of cobaltic oxide ($Co_3O_4$) in aqueous solution will yield useful blue colors. This percentage of active colorant may be attained by employing aqueous solutions of the following three cobalt compounds in the quantitative ranges indicated:

| | Percent |
|---|---|
| Cobaltous sulfate ($CoSO_4$) | .0019–.19 |
| Cobaltous chloride ($CoCl_2$) | .0016–.16 |
| Cobaltous nitrate [$Co(NO_3)_2 \cdot 6H_2O$] | .0036–.36 |

Another common useful glass colorant is iron which may be used in the present method in aqueous solutions containing .04 to 2.5% of ferric oxide ($Fe_2O_3$). To attain this range of colorant aqueous solutions of .06 to .40% ferrous chloride ($FeCl_2$) or .08 to .5% of ferric chloride ($FeCl_3$) would be employed. Other conventional glass colorants in aqueous solution may be employed.

The following table sets forth minimum suitable flow rates of aqueous colorant solutions of the foregoing general types. It is to be noted that the solubility of the colorant compounds is greater at higher temperatures. Therefore, more concentrated solutions and lower flow rates may be employed at higher temperatures.

TABLE

| Percent coloring agent desired | Percent oxide calculated | Minimum aqueous flow rate of solution at 32° F. (ml./min.) |
|---|---|---|
| 0.0016% CoCl | 0.001% $Co_3O_4$ | .7 |
| 0.16% CoCl | 0.1% $Co_3O_4$ | 70 |
| 0.0019% $CoSO_4$ | 0.001% $Co_3O_4$ | 1 |
| 0.19% $CoSO_4$ | 0.1% $Co_3O_4$ | 100 |
| 0.0036% $Co(NO_3)_2 \cdot 6H_2O$ | 0.001% $Co_3O_4$ | .5 |
| 0.36% $Co(NO_3)_2 \cdot 6H_2O$ | 0.1% $Co_3O_4$ | 50 |
| 0.034% $CuCl_2$ | 0.02% CuO | 9 |
| 0.84% $CuCl_2$ | 0.5% CuO | 230 |
| 0.04% $CuSO_4$ | 0.02% CuO | 50 |
| 0.84% $CuSO_4$ | 0.5% CuO | 1,350 |
| 0.06% $FeCl_2$ | 0.04% $Fe_2O_3$ | 18 |
| 0.40% $FeCl_2$ | 0.25% $Fe_2O_3$ | 120 |
| 0.08% $FeCl_3$ | 0.04% $Fe_2O_3$ | 17 |
| 0.5% $FeCl_3$ | 0.25% $Fe_2O_3$ | 100 |

I claim:
1. A method of producing colored glass by adding colorant to molten glass in a glass furnace forehearth after melting and fining thereof, said method comprising introducing into the lower portion of the body of molten glass in said forehearth an aqueous solution of water soluble compounds of elements of the class consisting of chromium, copper, cobalt and iron whereby said solution is gasified by heat from the molten glass and bubbles upwardly therethrough to deposit colorant into the glass and mix the same with the molten glass by the turbulence and agitation produced by the expanding and rising bubbles.

References Cited
UNITED STATES PATENTS

| | | | |
|---|---|---|---|
| 1,834,631 | 12/1931 | Mulholland | 65—335 XR |
| 2,354,807 | 8/1944 | Fox et al. | 65—178 XR |
| 2,331,052 | 10/1943 | Shadduck | 65—178 XR |
| 2,976,161 | 3/1961 | Smith | 106—52 XR |
| 3,203,816 | 8/1965 | Bull et al. | 106—52 XR |
| 3,208,841 | 9/1965 | Burch | 65—335 XR |
| 3,364,042 | 1/1968 | Swain et al. | 65—134 XR |

FOREIGN PATENTS

| 1,813 | 1856 | Great Britain. |
|---|---|---|
| 611,401 | 10/1948 | Great Britain. |

S. LEON BASHORE, Primary Examiner

F. W. MIGA, Assistant Examiner

U.S. Cl. X.R.

65—30, 178, 335; 106—52